United States Patent
Caron et al.

(10) Patent No.: US 8,186,219 B2
(45) Date of Patent: *May 29, 2012

(54) METHOD OF DETERMINING A SPEED OF ROTATION OF AN AXIALLY SYMMETRICAL VIBRATING SENSOR, AND A CORRESPONDING INERTIAL DEVICE

(75) Inventors: Jean-Michel Caron, Saint-Gratien (FR); David Roberfroid, Paris (FR)

(73) Assignee: SAGEM Defense Securite, Paris (FR)

( * ) Notice: Subject to any disclaimer, the term of this patent is extended or adjusted under 35 U.S.C. 154(b) by 559 days.

This patent is subject to a terminal disclaimer.

(21) Appl. No.: 12/368,001

(22) Filed: Feb. 9, 2009

(65) Prior Publication Data

US 2009/0205422 A1   Aug. 20, 2009

Related U.S. Application Data

(63) Continuation-in-part of application No. 11/898,495, filed on Sep. 12, 2007, now Pat. No. 7,621,184.

(30) Foreign Application Priority Data

Aug. 23, 2007   (FR) ..................... 07 05976

(51) Int. Cl.
G01P 9/04    (2006.01)

(52) U.S. Cl. .................................. 73/504.13

(58) Field of Classification Search ............... 73/504.13, 73/504.12, 504.04, 504.16, 504.15, 1.37, 73/1.38, 1.77, 1.78
See application file for complete search history.

(56) References Cited

U.S. PATENT DOCUMENTS

| | | | | |
|---|---|---|---|---|
| 5,616,864 A * | 4/1997 | Johnson et al. | ............ | 73/504.04 |
| 5,712,427 A * | 1/1998 | Matthews | .................. | 73/504.04 |
| 7,127,946 B2 * | 10/2006 | Renault | ..................... | 73/504.13 |
| 7,621,184 B2 * | 11/2009 | Caron | ........................ | 73/504.13 |

FOREIGN PATENT DOCUMENTS

EP   1445580 A1   8/2004

* cited by examiner

*Primary Examiner* — Helen C. Kwok
(74) *Attorney, Agent, or Firm* — Muncy, Geissler, Olds & Lowe, PLLC

(57) ABSTRACT

A method and device of determining a speed of rotation of an axially symmetrical vibrating sensor. The sensor has a vibrating member associated with control electrodes and with detection electrodes for generating a vibration presenting an elastic line possessing periodicity of order n and having a position that is variable as a function of the rotation of the sensor. The method includes performing successive evaluations of the speed for a predetermined number of positions of the vibration relative to the electrodes. The positions are geometrically offset relative to each other and the vibration is moved from one position to another by applying a precession command using a pre-established scale factor. The method also includes determining a speed of rotation in function of the evaluations.

21 Claims, 2 Drawing Sheets

METHOD OF DETERMINING A SPEED OF ROTATION OF AN AXIALLY SYMMETRICAL VIBRATING SENSOR, AND A CORRESPONDING INERTIAL DEVICE

CROSS REFERENCE TO RELATED APPLICATIONS

This application is a Continuation-in-Part of co-pending application Ser. No. 11/898,495, filed on Sep. 12, 2007, and for which priority is claimed under 35 U.S.C. §120; the entire contents of which are hereby incorporated by reference.

The present invention relates to a method of determining a speed of rotation of an axially symmetrical vibrating sensor, and to a corresponding inertial device including an axially symmetrical vibrating sensor. The invention more precisely concerns sensors presenting an angular drift of the position of the vibration, sais angular drift harmonically depending on the position of said vibration relative to the casing of the device.

BACKGROUND OF THE INVENTION

In order to determine the orientation of a carrier, in particular in order to navigate an airplane, it is known that an inertial device can be used that comprises one or more axially symmetrical vibrating sensors, each making use of a resonator possessing symmetry of order equal to or greater than 4 and implementing two degenerate modes of vibration that are identical and orthogonal, having a shape or elastic line that possesses periodicity of order n relative to the axis of symmetry, i.e. an elastic line having n times the same vibration pattern over one revolution around the axis of symmetry. In particular, it is known to use sensors of order 2 such as hemispherical bell vibrating sensors including an appropriate number of electrodes, or quapasons for which the vibration orientations of the two modes are not geometrically orthogonal but are modally orthogonal, i.e. modally offset by $\pi$.

It is also known that an axially symmetrical vibrating sensor is adapted to operate in free gyro mode or in rate gyro mode. In free gyro mode the vibration is sustained, but its position is left free; when the orientation of the carrier varies, the position of the vibration relative to its base is representative of the angle through which the carrier has turned.

In rate gyro mode, the vibration is sustained and its position relative to its base is kept constant by delivering suitable electronic commands; the values of said commands are then representative of the speed or rate of rotation of the carrier in inertial space.

It is also known that vibrating gyros present a drift error that is manifested when the gyro is operating in free gyro mode by variation in the position of the vibration even when the carrier is not subject to any rotation. This drift has two components, a constant component, which for a hemispherical resonant gyro is of the order of a few hundredths of a degree per hour, and a component known as alternating drift that is made up of harmonics, mainly a harmonic having the same order n as the vibrating sensor and a harmonic of order twice that of the vibrating sensor, depending on the position of the vibration. With a hemispherical resonator gyro, the harmonic of order n gives rise to a drift error of the order of one degree of per hour and the harmonic of the order 2n gives rise to a drift error of the order of one-tenth of a degree per hour.

It is known to calibrate gyros in a workshop and to draw up correction tables that can be applied while the gyro is in use. Nevertheless, drift error is not only a function of the position of the vibration, but also a function of ambient temperature and of the aging of the gyro. In practice, possibilities for correction are therefore limited.

OBJECT OF THE INVENTION

An object of the invention is to determine the speed of rotation of an axially symmetrical vibrating sensor by minimizing drift error.

SUMMARY OF THE INVENTION

In order to achieve this object, the invention provides a method of determining a speed of rotation of an axially symmetrical vibrating sensor having a vibrating member associated with control electrodes and with detection electrodes for generating vibration presenting an elastic line possessing periodicity of order n and having a position that is variable as a function of the rotation of the sensor, the method comprising the steps of:
performing evaluation of the speed of rotation successively for a predetermined number of positions of the vibration relative to the electrodes; the positions being geometrically offset relative to each other and the vibration being moved from one position to another by applying a precession command using a preestablished scale factor;
determining a speed of rotation in function of the evaluations.

Considering several evaluations each performed in a different position of the vibration enables to reduce or eliminate the error generated by the harmonic drift.

According to a first aspect of the invention, the evaluations are performed for N positions offset by at least one angular offset and wherein the step of determining the speed of rotation comprises the step of taking a mean of the evaluations of the speed of rotation in at least two of the N positions.

The effect of the error that results from the harmonic of order n is linked to the amplitude of said harmonic and the phase of the harmonics depend on the position of the vibration. Thus, taking a mean of the evaluations of the speed of rotation in several positions permits to eliminate the effects of the harmonics by using positions such that the sum of the amplitudes is null taking into account the phase of the harmonics in these positions: for example positions for which the harmonics have identical absolute values and opposite phases. Drift error is then minimized regardless of temperature or of the degree of aging of the sensor.

Preferably, the angular offset between the positions is linked to the number N of positions and to the order n of the elastic line of the vibration by the following formula:

$$\text{angular offset} = 2\pi/Nn.$$

Thus, the angular offset between two consecutive positions among N positions is:
$\pi/n$ for N=2
$2\pi/3n$ for N=3
$\pi/2n$ for N=4
Etc. ...
According to a specific embodiment, the evaluation is performed for two positions: a first position and a second position offset by $\pi/n$ relative to the first position.

This eliminates the effect of the harmonic of order n. For two vibration positions offset by $\pi/n$, the harmonic of order n has amplitudes of the same absolute value but of opposite sign, such that by taking the mean of the evaluations in two positions that are symmetrically offset by π/n, the modal offset is π, such that the amplitudes of the error due to the harmonic of order n cancel.

According to an advantageous aspect of the invention, the method further includes the following steps:
- applying the precession command to bring the vibration successively into positions that are geometrically offset by π2n and 3π/2n relative to the first position;
- performing evaluations of the speed of rotation for said positions of the vibration; and
- taking a mean of the evaluations of speed of rotation for all of the evaluations performed.

Thus, not only are the effects of the harmonic of order n eliminated, but so also are those of the harmonic of order 2n. Between a position that is geometrically offset by π/2n and a position that is geometrically offset by 3π/2n, the modal offset is π, such that the harmonic of order n is eliminated in the same manner as above. Furthermore, for the initial position and for the position that is geometrically offset by π/n, the harmonic of order 2n generates drift errors having the same amplitude and the same sign whereas for the positions that are geometrically offset by π/2n and 3π/2n, the harmonic of order 2n generates drift errors having the same amplitudes but of sign opposite to the drift error in the initial position. By taking the mean of the four evaluations, the error due to the harmonic of order 2n is thus eliminated.

According to another specific embodiment, the evaluation is performed for three positions: a first position, a second position offset by 3π/2n relative to the first position and a third position offset by 4π/3n relative to the first position.

Performing an evaluation in each of the three positions enables, according to the same principle as the one previously mentioned, the elimination of the harmonics of the orders n and 2n.

As a general consideration, taking a mean on N positions permits to eliminate all the harmonics except these ones having an order 2kn, k being an integer.

For the particular configuration of a hemispherical vibrating gyro used with an elastic line of order 2, i.e. n=2 and as specific examples:
- using two positions θ0 and θ2=θ0+90° permits to eliminate the harmonics of orders 2, 6, 10, 14, 18 and 20,
- using three positions θ0, θ4=θ0+60° and θ5=θ0+120° permits to eliminate the harmonics of order 2, 4, 8, 10, 14, 16, 20,
- using four positions θ0, θ1=θ0+45°, θ2=θ0+90°, and θ3=θ0+135°, permits to eliminate the harmonics of orders 2, 4, 6, 10, 12, 14, 18, 20.

It can be noticed that choosing three positions is particularly judicious because with a small number of positions the harmonics of orders 2 and 4, which are dominating, are eliminated together with a large number of secondary harmonics.

It should also be observed that the invention described is based on assuming the differences in measured speeds of rotation in the various positions of the vibration are due to the harmonic drift of the resonator: it is therefore necessary for the speed of rotation applied to the sensor to be constant throughout all of the measurements, otherwise it is not possible to cancel the harmonic drift term. More precisely, the real constraint is that the differences between the speeds of rotation at the periods of time corresponding to the measurements must be known, with a constant speed then corresponding merely to the special case where the difference is zero.

According to a second aspect of the invention, the evaluation is performed for a number of positions at least equal to 2 N+1 and the method comprises the step of identifying, from the 2 N+1 evaluations, at least one harmonic drift of the vibration until an order N, and wherein the step of determining the speed of rotation is performed from at least one of the evaluations from which the identified harmonic drift has been subtracted.

Each evaluation comprises non harmonic drift, harmonic drift and noise. The identifying step permits to identify the harmonic to the order N to subtract it from at least one of the evaluations in such a way that the determined speed of rotation has not been modified by this harmonic drift.

Advantageously, the method comprise the steps of subtracting the harmonic drift from several evaluations and taking a mean of said several evaluations from which the identified harmonic drift has been subtracted.

Taking a mean permit a reduction of the noise in the determined speed of rotation.

In both aspects of the invention, the residual drift error is thus small and due to the constant component and also to harmonics of higher orders that could be eliminated by continuing with the above-described method, but that are of amplitudes that are small enough to make this unnecessary, a priori. The error can then be compensated during initial calibration of the device, and the measurement of speed of rotation by the device is then disturbed only by variations in a value that is initially small and that is compensated.

The lack of linearity generated by the electronic encoders used for measuring the angular position of the vibration is at its worst for input values of zero, so the angles used for measuring the speed of rotation are selected to avoid zero values being output by the detection electrodes (i.e. constituting input signals applied to the angle encoders).

The invention also concerns an inertial device comprising an axially symmetrical vibrating sensor having a vibrating member associated with control electrodes and with detection electrodes, and means for exciting the sensor so as to generate a vibration presenting an elastic line possessing a periodicity order n, the device including means for performing successive evaluations of the speed of rotation of the sensor while the vibration is in a predetermined number of positions geometrically offset relative to the electrodes, means for applying a precession command using a pre-established scale factor to move the vibration from one position to another, and means for determining a speed of rotation in function of the evaluations for taking a mean between the evaluations of the speed of rotation of the sensor in the first position of the vibration and in the second position of the vibration.

BRIEF DESCRIPTION OF THE DRAWINGS

Other characteristics and advantages of the invention appear on reading the following description of a particular and non-limiting embodiment of the invention with reference to the accompanying figures, in which.

DETAILED DESCRIPTION OF THE INVENTION

Figure 1:
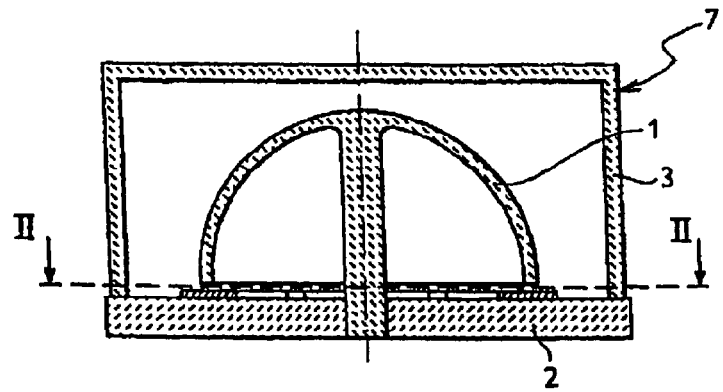
FIG. 1 is a diagrammatic axial section on line I-I of FIG. 2 showing a hemispherical bell vibrating sensor.
Figure 2:
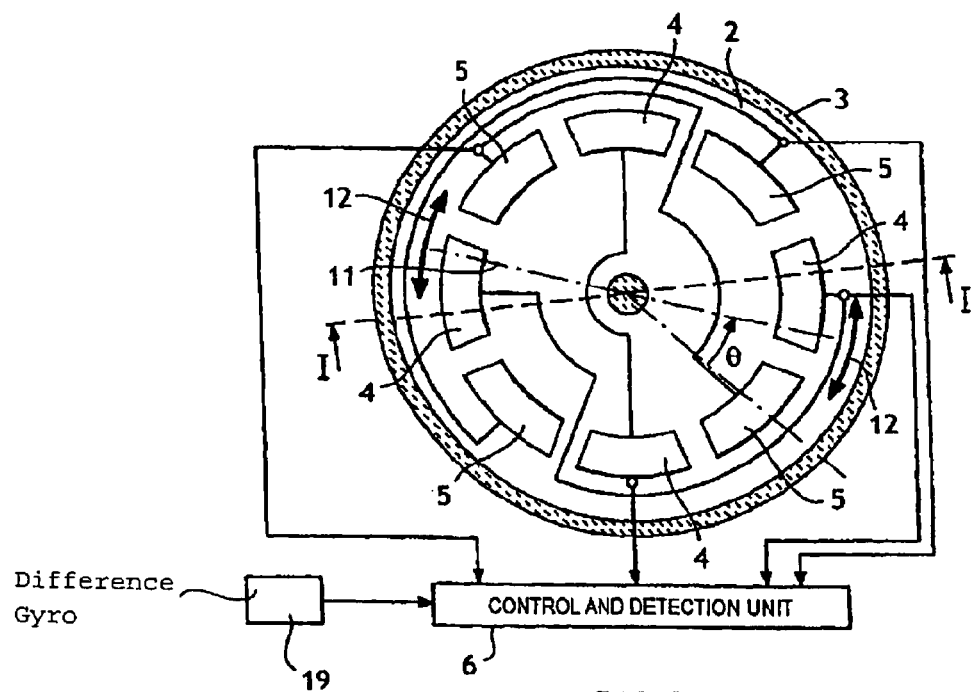
FIG. 2 is a section view on line II-II of FIG. 1.

With reference to FIGS. 1 and 2, the inertial device of the invention is illustrated as a vibrating sensor with an elastic line of order 2. The device comprises a hemispherical bell vibrating sensor 7 comprising in conventional manner a silica bell 1 mounted on a base 2 likewise made of silica, the bell 1 being surrounded by a sealed housing 3 enabling the sensor to be put under a vacuum.

Also in conventional manner, the inside surface of the bell 1 is metallized as is its bottom edge, and the bottom edge extends facing two pairs of control electrodes 4 and two pairs of detection electrodes 5 that are suitably connected to a control and detection unit 6 for generating vibration 11 represented by a chain-dotted line in FIG. 2 and of position that is identified by an angle θ relative to a reference electrode 5. The position of the vibration 11 is controlled by the control unit 6 applying precession command to the control electrodes 4.

Two implementations of the method of the invention are described hereafter.

Figure 3:
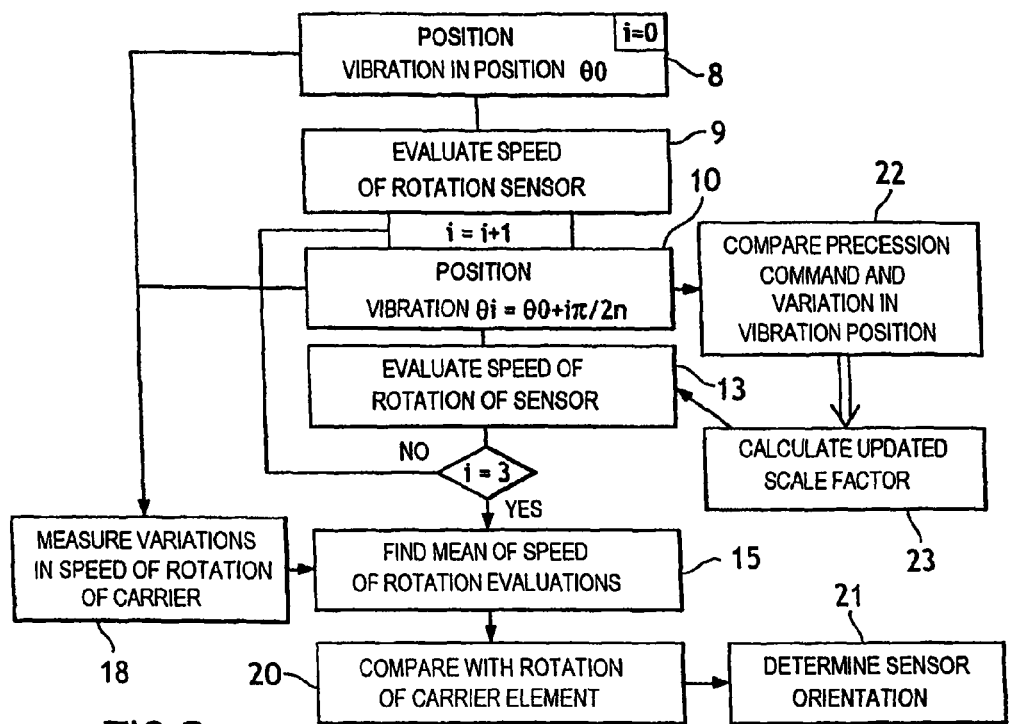
FIG. 3 is a block diagram showing an implementation of the method of the invention and its variant applications.

With reference to FIG. 3, the first implementation of the method of the invention comprises a first step 8 of positioning the vibration in a first position θ0.

For the first position θ0 of the vibration, the method comprises a step 9 of evaluating the speed of rotation of the sensor. This evaluation of the speed of rotation is performed by using the gyro in known manner either in a free gyro mode or in a rate gyro mode.

In a free gyro mode, a series of measurements are taken of the position of the vibration over a short period of time during which the displacement of the vibration is small relative to the periods of the harmonics of orders 2 and 4. In particular, in the application where the method is implemented to seek north, the gyro is preferably stationary relative to the surface of the Earth, so that the maximum speed of rotation of the gyro is that of terrestrial rotation, i.e. a speed of rotation of 15° per hour (h). If the speed of rotation of the sensor operating in free gyro mode is performed over ten seconds, then the variation in the position of the vibration is completely negligible.

In order to avoid any variation in the position of the vibration and in order to avoid errors due to defective coding of the position of the vibration, it is preferable at low speeds of rotation to perform evaluation in free gyro mode even though the scale factor is less accurate than in rate gyro mode.

A step 10 is then performed of modifying the position of the vibration by applying a precession command to the control electrodes 4 and then the speed of rotation of the sensor in the modified position is then evaluated 13. In the preferred implementation, the vibration is placed 14 in three modified positions θ1, θ2, and θ3 that are respectively offset geometrically from the initial position θ0 so as to be positioned at angles θi=θ0 +iπ/2n where i is an integer lying in the range 1 to 3, which for n=2 corresponds to offsets of 45°, 90°, and 135°.

Figure 4:
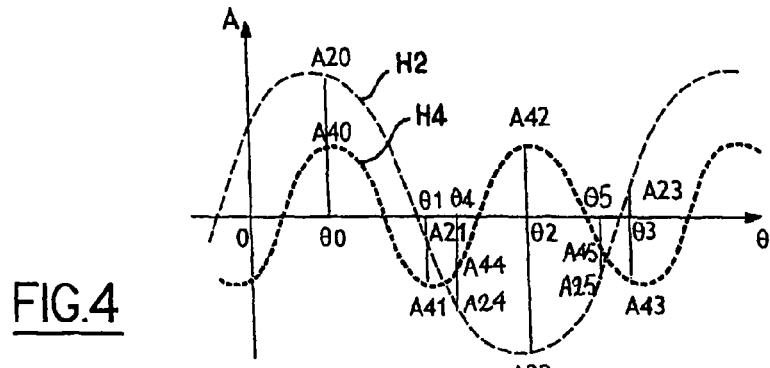
FIG. 4 is a diagram showing the amplitudes of the harmonics of orders 2 and 4 as a function of the position of the vibration relative to a reference electrode.

A mean is then taken 15 between the various evaluations of the speed of rotation of the sensor. As shown in FIG. 4, the amplitude A22 of the harmonic of order 2 for the position θ2 that is offset by 90° relative to the initial position θ0 is equal in absolute value and of opposite sign to the amplitude A20 of the harmonic of order 2 in position θ0.

Similarly, the amplitude A23 of the harmonic of order 2 for the position θ4 of the vibration has the same value but the opposite sign to the amplitude A21 of the harmonic of order 2 for the position θ1. While establishing the mean, drift errors due to the second harmonic therefore cancel in pairs.

As for the harmonic of order 4, the amplitudes A41 and A43 for the positions at angles θ1 and θ3 are of the same value and of opposite sign compared with the amplitudes A40 and A42 for the vibration positions at angles θ0 and θ2. When taking the mean, these four values compensate one another.

In a variant, the vibration is positioned in two modified positions θ4, θ5 geometrically offset to 60° and 120° respectively relative to the initial position θ0 so that θ4=θ0+Π/3 et θ5=θ0+2Π/3.

As previously mentioned, the evaluation of the speed of rotation is performed when the vibration is in each of the positions θ0, θ4, θ5 and a mean is then taken between the various evaluations of the speed of rotation of the sensor. As shown in FIG. 4, the amplitudes A24 and A25 of the harmonic of order 2 for the positions θ4 and θ5 that are offset by 60° and 120° relative to the initial position θ5 have opposite signs compared with the amplitude A20 of harmonic of order 2 for the position θ0 and the sum of the absolute values of the amplitudes A24 and A25 is equal to the absolute value of the amplitude A20. The sum of the amplitudes A20, A24, A25 is therefore null. Similarly, the amplitudes A44 and A45 of the harmonics of order 4 for the positions θ4 and θ5 have opposed signs compared with the amplitude A40 and the sum of the absolute values of the amplitudes A44 and A45 is equal to the absolute value of the amplitude A40. The sum of the amplitudes A40, A44 and A45 is therefore null.

When the mean is taken, the drift errors due to harmonics of orders 2 and 4 nullify.

In fact, in this implementation and its variant, harmonics of higher orders are also eliminated in the same way as harmonics of order 2 and 4 are.

Thus:
using two positions θ0 and θ2=θ0+90° permits to eliminate the harmonics of orders 2, 6, 10, 14, 18, 20,
using three positions θ0, θ4=θ0+60° and θ5=θ0+120° permits to eliminate the harmonics of order 2, 4, 8, 10, 14, 16, 20,
using four positions θ0, θ1=θ0+45°, θ2=θ0+90°, θ3=θ0+ 135°, permits to eliminate the harmonics of orders 2, 4, 6, 10, 12, 14, 18, 20.

The initial position is selected while taking account of the offset positions, so that in each of the positions the corresponding detection signal has a value that is not zero so as to ensure that the analog signals delivered by the detection electrodes 5 are converted with good quality into digital signals.

By way of example, for precession at a speed of 5°/s, about ten seconds are needed to turn the position of the vibration through 45°. About fifteen seconds are also needed to evaluate the speed of rotation in a given position. When making evaluations in four positions, the total time required for evaluation is of the order of one hundred seconds. This time can be shortened at the expense of a small loss of accuracy by performing evaluation in two positions only, a first evaluation corresponding to a first position θ0 and a second evaluation corresponding to the second position θ2 offset by 90° from the first position. Under such circumstances, the error due to the harmonic of order 2 is eliminated while the error due to the harmonic of order 4 is maintained. Nevertheless, in this context, it should be observed that contrary to the view shown in FIG. 4 where the harmonic of order 4 is deliberately exaggerated for better understanding, in practice the harmonic of order 4 has an amplitude that is much smaller than the harmonic of order 2. For a hemispherical resonant gyro, the harmonic of order 2 generally gives rise to drift of the order of one degree per hour, whereas the harmonic of order 4 gives rise to drift of the order of one-tenth of a degree per hour.

In this context, it should be observed that the amplitudes of the harmonics of order 2 and of order 4 compensate directly only when the speed of rotation of the gyro is constant throughout the duration of the measurements used for evaluating the speed of rotation.

When the speed of rotation of the gyro is not constant, it nevertheless remains possible to take advantage of the invention. Under such circumstances, it suffices for example to have means for measuring 18 variations in the speed of rotation and to subtract from these variations the speed of rotation that is evaluated in each position. These steps are implemented for example by a difference gyro 19 connected to the control and detection unit 16 in parallel with the vibrating sensor 7. The difference gyro 19 presents poor accuracy for absolute speed measurement but good accuracy for measuring differences over a very short time.

The difference gyro 19 is preferably implemented by integrating variations measured over the same periods of time as one integration of the speed of rotation measured with the vibrating sensor. The mean giving the final evaluation of the speed of rotation is then obtained very simply by summing the integrals and dividing by the total time for measuring the speed of rotation.

The second implementation of the method of the invention comprises the steps of:
  performing an evaluation of the speed of rotation successively for each one of a number of positions of the vibration at least equal to 2N+1 relative to the electrodes, the positions being geometrically offset one to each other and the vibration being positioned in each of the position by applying a precession command using a preestablished scale factor,
  identifying, from the 2N+1 evaluations, at least one harmonic drift of the vibration until an order N,
  determining a speed of rotation from at least one of the evaluation from which the identified harmonic drift has been subtracted.

The model of harmonic drift error of an axisymetric vibrating sensor is of the following type $$\text{Drift} \sum_{i=1}^{N} bc_i \cos(2i\Theta e) + \sum_{i=1}^{N} bs_i \sin(2i\Theta e)$$

where $\Theta e$ is the electrical angle, $bc_i$ and $bs_i$ are constant. Considering only the harmonic drift of order 1, the evaluation of the speed of rotation for a given electrical angle is $V = bc_1 \cos(2\Theta e) + bs_1 \sin(2\Theta e) + \text{vitesse de rotation} + \text{bruit}$.

Assuming $X = V - \text{vitesse de rotation}$ leads to $bc_1 \cos(2\Theta e) bs_1 \sin(2\Theta e) = X - \text{bruit}$, i.e. an equation with three unknowns.

With the second implementation of the method of the invention, an evaluation is performed for a number of positions sufficient to calculate the unknowns, i.e. three in this case.

For the electric angle $\Theta 0$, $\Theta 4$ and $\Theta 5$ corresponding to the positions $\Theta 0$, $\Theta 4$ and $\Theta 5$, the equations are $bc_1 \cos(2\Theta 0) + bs_1 \sin(2\Theta 0) = X + \text{bruit}$ $bc_1 \cos(2\Theta 4) + bs_1 \sin(2\Theta 4) = X + \text{bruit}$ $bc_1 \cos(2\Theta 5) + bs_1 \sin(2\Theta 5) = X + \text{bruit}$ The unknowns are then calculated with a classical manner. When the terms $bc_1$, $bs_1$, a, d $X$ have been calculated, the harmonic drift is calculated and subtracted from one of the evaluation to obtain the speed of rotation.

To obtain a more accurate speed, the harmonic drift is subtracted from each of the evaluations and the speed of rotation is calculated by taking the mean of the evaluations thus modified.

Positioning the vibration in each of the position and evaluating the speed of rotation for each of these positions is realized in the same way as in the first implementation. Preferentially, the initial position is selected while taking account of the offset positions, so that in each of the positions the corresponding detection signal has a value that is not zero so as to ensure that the analog signals delivered by the detection electrodes 5 are converted with good quality into digital signals. The method of the invention makes it possible in particular to improve the implementation of applications that make use of an evaluation of a constant speed of rotation, in particular for seeking north, or an alignment relative to a reference element.

Figure 5:
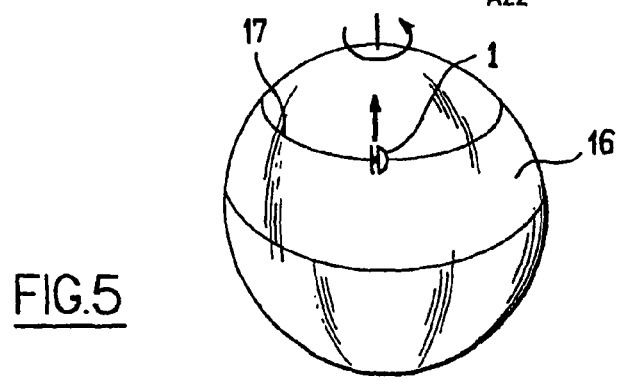
FIG. 5 is a diagram of the terrestrial globe and a vibrating sensor illustrating the invention being applied to seeking north.

FIGS. 2 and 5 show an application to seeking north when the inertial device containing the vibrating sensor 1 is stationary relative to the terrestrial globe 16. Given the rotation of the Earth about the north-south axis, a vibrating sensor 1 having its axis of symmetry extending parallel to a tangent to a parallel 17 passing through the sensor, i.e. in an east-west direction, no rotation is perceived. From an orientation in which the sensor is subjected to a speed of rotation that is not zero, the method implementing the application comprises in conventional manner a step 20 of comparing the speed of rotation of the sensor with the speed of rotation of the reference element, i.e. the rotation of the Earth when the sensor is carried by the ground, and a step 21 of determining the orientation of the sensor by applying trigonometric formulae giving the component of the rotation of the vibrating sensor as a function of its orientation. The accuracy with which the speed of rotation is evaluated using the method of the invention makes it possible to implement this application with improved accuracy for determining north. In order to obtain better accuracy in determining north, the axis of symmetry of the gyro is preferably placed approximately on an east-west direction.

For an alignment of the inertial device prior to navigation, the inertial device preferably has three vibrating sensors with their axes disposed in three orthogonal directions.

According to yet another aspect of the invention, the modification to the position of the vibration for the purpose of evaluating the speed of rotation provides an opportunity to perform a comparison 22 between the precession command and the variation in the position of the vibration, and to perform a calculation 23 of an updated scale factor which can be used immediately for evaluating the speed of rotation of the vibrating sensor.

The various steps of the method of the invention are preferably implemented by software integrated in the control unit 6 which, together with the vibrating sensor, constitutes an inertial device.

According to the first aspect of the invention, the software comprises modules of instructions for performing the evaluations, applying the precession command and determining the speed of rotation. These modules are programmed for performing the evaluations for N positions offset by at least one angular offset and for determining the speed of rotation by taking a mean of the evaluations of the speed of rotation in at least two of the N positions. These modules are more precisely programmed for linking the angular offset between the positions to the number N of positions and to the order n of the elastic line of the vibration by the following formula angular offset = $2\pi/Nn$.

Moreover these modules are programmed for
  performing the evaluation for two positions: a first position ($\Theta o$) and a second position offset by $\pi/n$ relative to the first position; or applying the precession command to bring the vibration successively into the first position, the second position and positions that are geometrically offset by π/2n and 3π/2n relative to the first position; performing evaluations of the speed of rotation for said positions of the vibration; and taking a mean of the evaluations of speed of rotation for all of the evaluations performed; or performing the evaluation for three positions: a first position (Θ0), a second position offset by 3π/2n relative to the first position and a third position offset by 4π/3n relative to the first position. According to the second aspect of the invention, these modules are programmed for performing the evaluation for each one of a number of positions at least equal to 2N+1 and for identifying, from the 2N+1 evaluations, at least one harmonic drift of the vibration until a row N, and for determining the speed of rotation from at least one of the evaluations from which the identified harmonic drift has been subtracted. Naturally, the invention is not limited to the implementations described and can be embodied in various ways that will appear to the person skilled in the art without going beyond the ambit of the invention as defined by the claims.

In particular, although the applications are described for a vibrating sensor that is stationary relative to the ground, the method of the invention can also be used when the inertial device is installed in a carrier that is movable relative to the ground.

Although the invention is described with reference to a gyro of order 2 (n=2), it applies likewise to a gyro of higher order.

The angular offsets between the positions can be identical or different one to each other.

The number of positions can be 2, 3, 4 or superior to 4.

The method of the invention can be implemented in a continuous way, for example with an integration of angle or attitude (using free-gyro measures and/or rate-gyro measures, and accelerometric measures) and a KALMAN filter incorporating an error model adapted to the sensor.

The method of the invention can also comprise the steps of:
calculating a mean of the evaluations,
calculating a mean of the harmonic drift,
substracting the mean of the harmonic drift from the mean of the evaluations.

It is also possible to perform additional corrections during the implementation of the method of the invention.

What is claimed is:

1. A method of determining a speed of rotation of an axially symmetrical vibrating sensor having a vibrating member associated with control electrodes and with detection electrodes for generating vibration presenting an elastic line possessing periodicity of order n and having a position that is variable as a function of a rotation of the sensor, the method comprising the steps of:
performing evaluations of the speed of rotation successively for a predetermined number of positions of the vibration relative to the detection electrodes; the positions being geometrically offset relative to each other and the vibration being moved from one position to another by applying a precession command using a pre-established scale factor;
determining a speed of rotation in function of the evaluations.

2. A method according to claim 1, wherein the evaluations are performed for N positions offset by at least one angular offset and wherein the step of determining the speed of rotation comprises the step of taking a mean of the evaluations of the speed of rotation in at least two of the N positions.

3. A method according to claim 2, wherein the angular offset between the positions is linked to the number N of positions and to the order n of the elastic line of the vibration by the following formula:

$$\text{angular offset} = 2\pi/Nn.$$

4. A method according to claim 3, wherein the evaluations are performed for two positions: a first position (Θo) and a second position offset by π/n relative to the first position.

5. A method according to claim 4, further comprising the steps of:
applying the precession command to bring the vibration successively into positions that are geometrically offset by π/2n and 3π/2n relative to the first position;
performing evaluations of the speed of rotation for said positions of the vibration; and
taking a mean of the evaluations of speed of rotation for all of the evaluations performed.

6. A method according to claim 3, wherein the evaluations are performed for three positions: a first position (Θo), a second position offset by 3π/2n relative to the first position and a third position offset by 4π/3n relative to the first position.

7. A method according to claim 1, wherein the evaluations are performed for a number of positions at least equal to 2N+1 and the method comprises the step of identifying, from the 2N+1 evaluations, at least one harmonic drift of the vibration until an order N, and wherein the step of determining the speed of rotation is performed from at least one of the evaluations from which the identified harmonic drift has been substracted.

8. A method according to claim 7, comprising the steps of substracting the harmonic drift from several evaluations and take a mean of said several evaluations from which the identified harmonic drift has been substracted.

9. A method according to claim 7, comprising the steps of:
calculating a mean of the evaluations,
calculating a mean of the harmonic drift,
substracting the mean of the harmonic drift from the mean of the evaluations.

10. A method according to claim 1, including a prior step of controlling the positioning of the vibration to occupy angles selected so that a corresponding detection signal has a value that is not zero.

11. A method according to claim 1, including the steps of:
performing a comparison between the precession command and a corresponding actual variation of angle; and
deducing therefrom an updated value of the scale factor.

12. A method according to claim 1, including the steps of:
measuring variations in the speed of rotation of the sensor; and
algebraically subtracting the measured variations while establishing the mean of the evaluations of speeds of rotation.

13. An inertial device comprising an axially symmetrical vibrating sensor having a vibrating member associated with control electrodes and with detection electrodes, and means for exciting the sensor so as to generate a vibration presenting an elastic line possessing periodicity of order n, the device including means for successively performing evaluations of speed of rotation of the sensor while the vibration is in each one of a predetermined number of positions geometrically offset relative to the detection electrodes, means for applying a precession command using a pre-established scale factor to move the vibration from one position to another, and means for determining a speed of rotation in function of the evaluations.

14. A device according to claim 13, wherein the means for performing the evaluations and the means for applying the precession command are arranged for performing the evaluations for N positions offset by at least one angular offset and for determining the speed of rotation by taking a mean of the evaluations of the speed of rotation in at least two of the N positions.

15. A device according to claim 13, wherein the means for performing the evaluations and the means for applying the precession command are arranged for linking the angular offset between the positions to the number N of positions and to the order n of the elastic line of the vibration by the following formula:

angular offset=$2\pi/Nn$.

16. A device according to claim 15, wherein the means for performing the evaluations and the means for applying the precession command are arranged for performing the evaluations for two positions: a first position ($\Theta o$) and a second position offset by $\pi/n$ relative to the first position.

17. A device according to claim 16, wherein the means for performing the evaluations and the means for applying the precession command are arranged for:
  applying the precession command to bring the vibration successively into positions that are geometrically offset by $\pi/2n$ and $3\pi/2n$ relative to the first position;
  performing evaluations of the speed of rotation for said positions of the vibration; and
  taking a mean of the evaluations of speed of rotation for all of the evaluations performed.

18. A device according to claim 15, wherein the means for performing the evaluations and the means for applying the precession command are arranged for performing the evaluations for three positions: a first position ($\Theta o$), a second position offset by $3\pi/2n$ relative to the first position and a third position offset by $4\pi/3n$ relative to the first position.

19. A device according to claim 13, wherein the means for performing the evaluations and the means for applying the precession command are arranged for performing the evaluations for each one of a number of positions at least equal to 2N+1 and for identifying, from the 2N+1 evaluations, at least one harmonic drift of the vibration until a row N, and for determining the speed of rotation from at least one of the evaluations from which the identified harmonic drift has been substracted.

20. A device according to claim 13, including:
  means for making a comparison between the precession command and a corresponding actual angle variation; and
  means for deducing an updated value of the scale factor.

21. A device according to claim 13, including:
  means for measuring variations of the speed of rotation of the sensor; and
  means for algebraically subtracting the measured variations while taking the mean of the evaluations of speeds of rotation.

* * * * *